(12) United States Patent
Alicoate et al.

(10) Patent No.: US 9,061,645 B2
(45) Date of Patent: Jun. 23, 2015

(54) METHODS AND APPARATUS FOR TRANSMISSION CONTROL OF A TRANSIT VEHICLE

(71) Applicant: Clever Devices, LTD., Woodbury, NY (US)

(72) Inventors: Thomas G. Alicoate, Arlington Heights, IL (US); Craig M. Lang, Northbrook, IL (US)

(73) Assignee: Clever Devices, Ltd, Woodbury, NY (US)

( * ) Notice: Subject to any disclaimer, the term of this patent is extended or adjusted under 35 U.S.C. 154(b) by 0 days.

(21) Appl. No.: 14/183,021

(22) Filed: Feb. 18, 2014

(65) Prior Publication Data

US 2014/0236421 A1   Aug. 21, 2014

Related U.S. Application Data

(60) Provisional application No. 61/765,352, filed on Feb. 15, 2013, provisional application No. 61/876,503, filed on Sep. 11, 2013.

(51) Int. Cl.
*B60R 25/20* (2013.01)

(52) U.S. Cl.
CPC ...................... *B60R 25/20* (2013.01)

(58) Field of Classification Search
None
See application file for complete search history.

(56) References Cited

U.S. PATENT DOCUMENTS

| | | |
|---|---|---|
| 4,754,255 A | 6/1988 | Sanders |
| 4,800,590 A | 1/1989 | Vaughan |
| 5,091,856 A | 2/1992 | Hasegawa |
| 5,422,632 A | 6/1995 | Bucholtz |
| 5,431,244 A | 7/1995 | Possobom |
| 5,519,260 A | 5/1996 | Washington |
| 6,060,981 A * | 5/2000 | Landes .................... 340/426.12 |
| 6,108,591 A | 8/2000 | Segal |
| 6,249,731 B1 * | 6/2001 | Miller et al. ..................... 701/48 |
| 6,253,138 B1 * | 6/2001 | Shober et al. ................... 701/51 |
| 6,353,776 B1 | 3/2002 | Rohri et al. |
| 6,380,848 B1 | 4/2002 | Weigl et al. |
| 6,487,484 B1 * | 11/2002 | Shober et al. ................... 701/51 |
| 6,525,643 B1 * | 2/2003 | Okada et al. ................. 340/5.24 |
| 6,572,015 B1 * | 6/2003 | Norton .......................... 235/382 |
| 6,604,685 B1 * | 8/2003 | Norton .......................... 235/492 |
| 6,703,721 B1 * | 3/2004 | Kito ............................. 307/10.3 |
| 6,710,700 B1 * | 3/2004 | Tatsukawa et al. .......... 340/5.53 |
| 6,909,362 B2 * | 6/2005 | Tanaka ..................... 340/426.28 |
| 7,009,499 B2 | 3/2006 | Bernosky et al. |
| 7,154,384 B2 | 12/2006 | Nitou |
| 7,185,198 B2 | 2/2007 | Nakamura |
| 7,388,472 B2 | 6/2008 | Mandle |
| 7,402,920 B2 * | 7/2008 | Kamiya ....................... 307/10.6 |
| 7,430,471 B2 | 9/2008 | Simon |
| 7,598,846 B2 | 10/2009 | Griffin |
| 7,650,509 B1 | 1/2010 | Dunning |
| 8,255,990 B2 | 8/2012 | Callenryd |
| 8,614,622 B2 * | 12/2013 | Van Wiemeersch et al. 340/5.54 |
| 8,918,251 B2 * | 12/2014 | Tarnutzer et al. ............... 701/36 |

(Continued)

*Primary Examiner* — Jonathan M Dager
(74) *Attorney, Agent, or Firm* — The Farrell Law Firm, P.C.

(57) ABSTRACT

Methods and apparatus are provided for controlling a transmission of a transit vehicle. A Vehicle Logic Unit (VLU) authenticates an operator of the transit vehicle, upon start-up of the transit vehicle and the VLU. The VLU transmits a signal enabling operator control of the transmission of the transit vehicle, when the operator of the vehicle is authenticated.

18 Claims, 8 Drawing Sheets

(56) References Cited

U.S. PATENT DOCUMENTS

| | | |
|---|---|---|
| 2003/0011487 A1* | 1/2003 | Bracklo et al. ............ 340/825.72 |
| 2004/0008103 A1* | 1/2004 | Kady et al. .................... 340/5.52 |
| 2004/0204795 A1* | 10/2004 | Harvey et al. ...................... 701/1 |
| 2005/0242920 A1* | 11/2005 | Bernosky et al. ............... 340/5.2 |
| 2006/0076834 A1* | 4/2006 | Kamiya ........................ 307/10.1 |
| 2006/0170286 A1* | 8/2006 | Voda et al. .................... 307/10.1 |
| 2006/0226961 A1* | 10/2006 | Bell et al. .................... 340/426.3 |
| 2006/0273879 A1* | 12/2006 | Pudelko et al. ............... 340/5.72 |
| 2007/0118752 A1* | 5/2007 | Kiessling et al. ............. 713/176 |
| 2007/0120645 A1* | 5/2007 | Nakashima .................. 340/5.61 |
| 2007/0182250 A1* | 8/2007 | Ozawa et al. ................. 307/10.2 |
| 2008/0302870 A1 | 12/2008 | Berini et al. |
| 2009/0182461 A1* | 7/2009 | Wagenhuber et al. ............ 701/2 |
| 2010/0057332 A1* | 3/2010 | Katoh et al. ................... 701/113 |
| 2011/0068895 A1* | 3/2011 | Gee et al. ...................... 340/5.67 |
| 2012/0130605 A1* | 5/2012 | Kuestler ......................... 701/51 |
| 2012/0232765 A1* | 9/2012 | Holub et al. ..................... 701/66 |
| 2012/0280805 A1* | 11/2012 | Magner et al. ........... 340/426.11 |
| 2013/0066525 A1* | 3/2013 | Tomik et al. .................... 701/45 |
| 2014/0156111 A1* | 6/2014 | Ehrman ............................ 701/2 |
| 2014/0222298 A1* | 8/2014 | Gurin .............................. 701/49 |
| 2014/0250530 A1* | 9/2014 | Moeller et al. .................. 726/23 |

\* cited by examiner

METHODS AND APPARATUS FOR TRANSMISSION CONTROL OF A TRANSIT VEHICLE

PRIORITY

This application claims priority under 35 U.S.C. §119(e) to U.S. Provisional Patent Application Nos. 61/765,352 and 61/876,503 filed on Feb. 15, 2013 and Sep. 11, 2013, respectively, the entire disclosures of which are incorporated herein by reference.

BACKGROUND OF THE INVENTION

1. Field of the Invention

The present invention relates generally to transit vehicle transmission control, and more particularly, to a method and system for transit vehicle transmission control via operator authentication.

2. Description of the Related Art

Unauthorized use of transit vehicles, such as buses, has become a problem for the transportation industry, making it imperative for transit authorities to restrict the use and operation of such transit vehicles to trained and trusted operators.

Security systems have been proposed that require an operator to enter a password in order to start the ignition of a transit vehicle. Additional anti-theft systems have been proposed that include a mechanical-electronic device capable of locking the transmission. The lock is released by entering a personal code number. Recently, such systems have also incorporated the use of biometric information to perform identification of a vehicle operator.

SUMMARY OF THE INVENTION

The present invention has been made to address at least the above problems and/or disadvantages and to provide at least the advantages described below. Accordingly, an aspect of the present invention provides a method and system for controlling the transmission of a vehicle via operator authentication.

According to one aspect of the present invention, a method is provided for controlling a transmission of a transit vehicle. A Vehicle Logic Unit (VLU) authenticates an operator of the transit vehicle, upon start-up of the transit vehicle and the VLU. The VLU transmits a signal enabling operator control of the transmission of the transit vehicle, when the operator of the vehicle is authenticated.

According to another aspect of the present invention, an apparatus is provided for controlling a transmission of a transit vehicle. The apparatus includes a memory, and at least one processor coupled to the memory and operative to authenticate an operator of the transit vehicle, upon start-up of the transit vehicle. The apparatus also includes a transmitter coupled to the at least one processor and operative to transmit a signal enabling operator control of the transmission of the transit vehicle, when the operator of the vehicle is authenticated.

According to an additional aspect of the present invention, an article of manufacture is provided for controlling a transmission of a transit vehicle. The article of manufacture includes a machine readable medium containing one or more programs, which when executed implement the steps of: authenticating an operator of the transit vehicle, upon start-up of the transit vehicle; and transmitting a signal enabling operator control of the transmission of the transit vehicle, when the operator of the vehicle is authenticated.

BRIEF DESCRIPTION OF THE DRAWINGS

The above and other aspects, features, and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
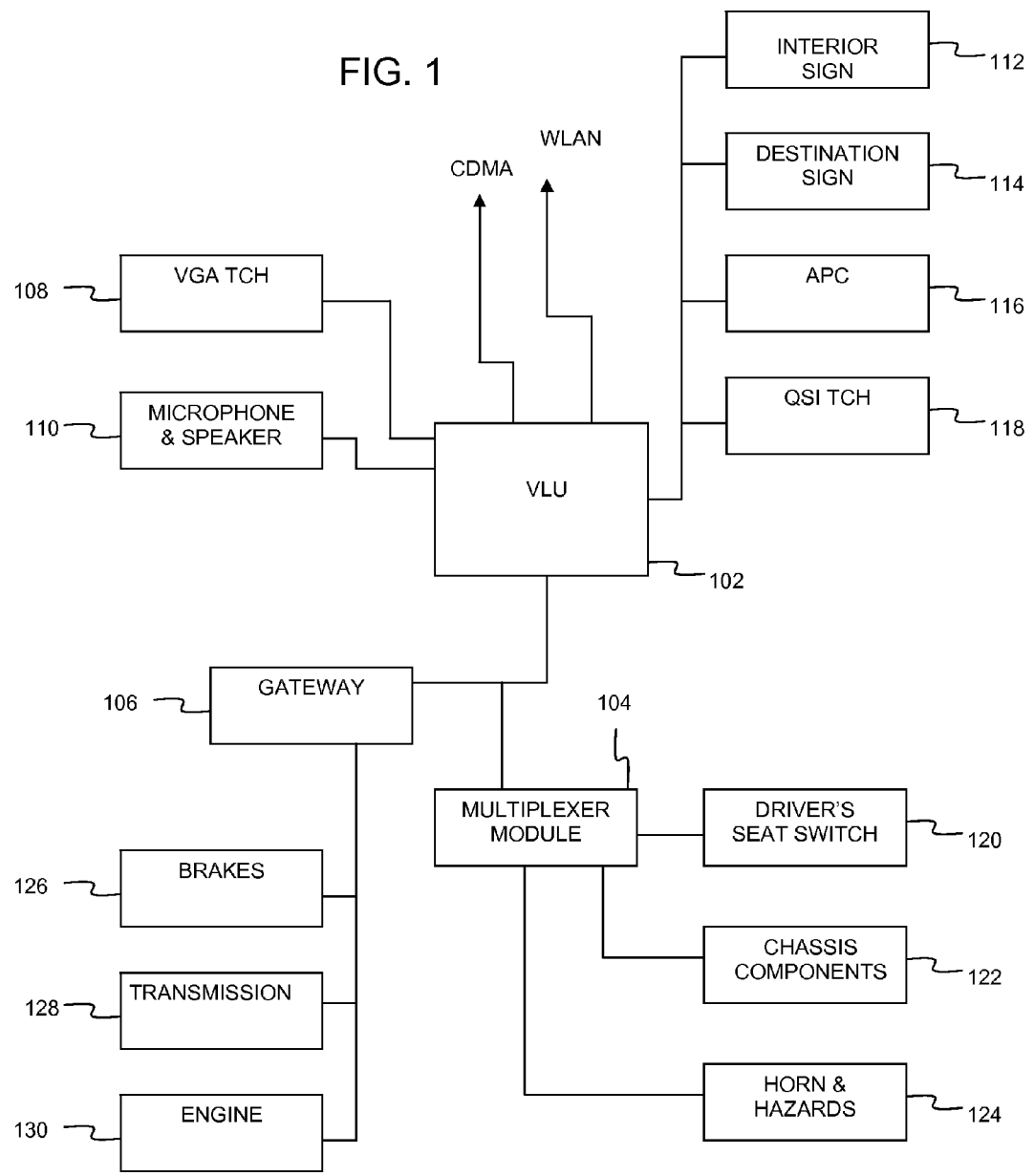
FIG. 1 is a diagram illustrating components of a system for transmission control of a transit vehicle, according to an embodiment of the present invention.

Embodiments of the present invention are described in detail with reference to the accompany drawings. The same or similar components may be designated by the same or similar reference numerals although they are illustrated in different drawings. Detailed descriptions of constructions or processes known in the art may be omitted to avoid obscuring the subject matter of the present invention.

In accordance with embodiments of the present invention, a system is provided for controlling the transmission of a transit vehicle via authentication of individuals that are authorized to operate the transit vehicle, such as, for example, a bus. The system can utilize various frontend systems to perform personnel database matches for authentication purposes. Matches may be performed using, for example, smart chip employee identification cards (i.e., smart cards), or secure PIN systems. Embodiments of the present invention are described with respect to secure PIN system, however alternative embodiments of the present invention may substitute smart card or biometric systems for the secure PIN system and function is substantially the same manner. The personnel databases may reside in a company's human resources system, and also in an on-board vehicle computer, referred to as a VLU, i.e., an Intelligent Vehicle Network (IVN).

A secure PIN may be generated for each operator using an algorithm that utilizes operator identification information (identification or badge number) and at least one other variable such as, for example, the date. Secure PINs can be generated on a number of different timeframes, i.e., per hour, day, or week. PINs may be generated and distributed to operators at a central location. For example, a kiosk-based system may generate the PIN and provide the PIN to the operator when the operator's identification information is entered. The operator then enters the identification information and the PIN into the VLU of the transit vehicle for operation of the transit vehicle. The VLU utilizes the same algorithm as the kiosk-based system to verify the entered PIN based on the entered identification information. Thus, it is not necessary for the kiosk-based PIN generation/distribution system to be in communication with the VLU of the transit vehicle.

In accordance with embodiments of the present invention, the VLU of the transit vehicle is responsible for authentication of the operator and for sending instructions to an appropriate multiplexor or controller regarding actions that can be taken by the transit vehicle. The VLU boots up upon ignition of the transit vehicle and prior to authentication. Once authentication is complete, the VLU sends a notification to the designated multiplexor or control unit, which will in turn send a message to the transmission, allowing it to be moved out of a neutral position. A gear selector of the transit vehicle can only be moved out of a neutral position when the identification information and a corresponding secure PIN of the operator are properly entered. After authentication and completion of a route by the operator, the vehicle transmission is removed from a forward or reverse gear, the operator logs off (or the system logs the operator off), and the system again locks the transmission into a neutral position.

While the embodiments of the present invention are described with reference to a transmission of a transit vehicle having an internal combustion engine, the embodiments of the present invention are equally applicable to an Electric Vehicle (EV). Specifically, the VLU performs in the same manner, sending a notification to a designated multiplexer or control unit, which will in turn send a message to a transmission equivalent in an EV, i.e., a motor control unit or shifter, to control power to and from the electric motor.

Referring initially to FIG. 1, a diagram illustrates a system configuration for controlling a transmission of a transit vehicle, according to an embodiment of the present invention. Specifically, FIG. 1 illustrates a system of a modern transit vehicle that is adapted to control vehicle transmission based on operator authentication. As shown in FIG. 1, a VLU 102 is connected to a multiplexor module 104 and a gateway 106 for transmission gear shift control. The VLU 102 is also in communication with a Video Graphics Array (VGA) Transit Control Head (TCH) 108, a microphone and speaker 110, interior signage 112, destination signage 114, an Automatic Passenger Counter (APC) 116, and a QSI TCH 118. The VLU 102 also includes Code Division Multiple Access (CDMA) and Wireless Local Area Network (WLAN) connections.

The multiplexer module 104 is in communication with a driver seat limit switch 120, chassis components 122, and a vehicle horn and hazard lights 124. The gateway 106 is in communication with vehicle brakes 126, a vehicle transmission 128, and a vehicle engine 130.

Figure 2:
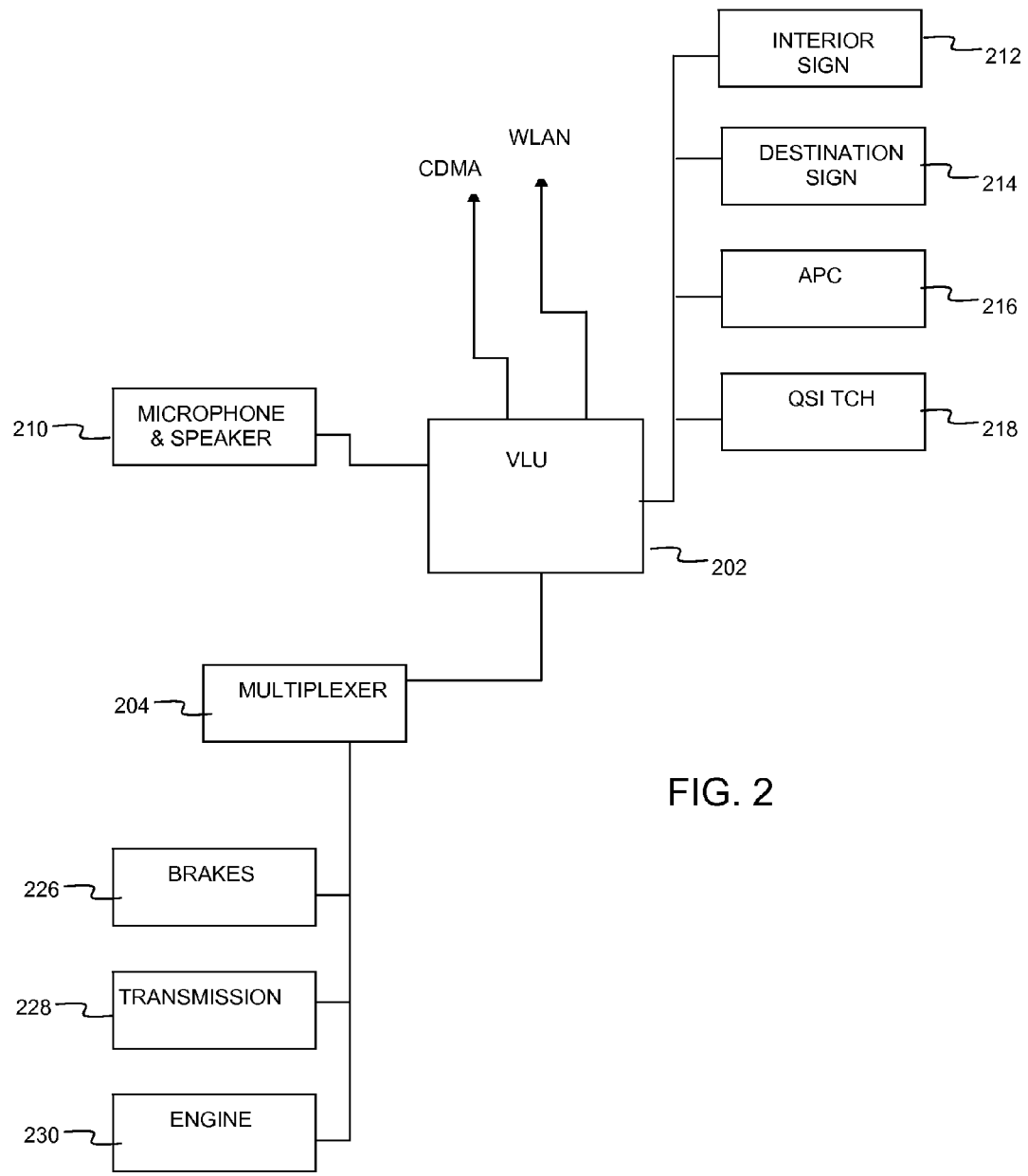
FIG. 2 is a diagram illustrating components of a system for transmission control of a transit vehicle, according to another embodiment of the present invention.

Referring to FIG. 2, a diagram illustrates a system configuration for controlling a transmission of a transit vehicle, according to another embodiment of the present invention. Specifically, FIG. 2 illustrates a system of a more traditional transit vehicle that is adapted to control vehicle transmission based on operator authentication. As shown in FIG. 2, a VLU 202 is connected to a multiplexor 204. The VLU 202 is also in communication with a microphone and speaker 210, interior signage 212, destination signage 214, an APC 216, and a QSI TCH 218. The VLU 202 also includes CDMA and WLAN connections. The multiplexer 204 is in communication with vehicle brakes 226, a vehicle transmission 228, and a vehicle engine 230.

Figure 3:
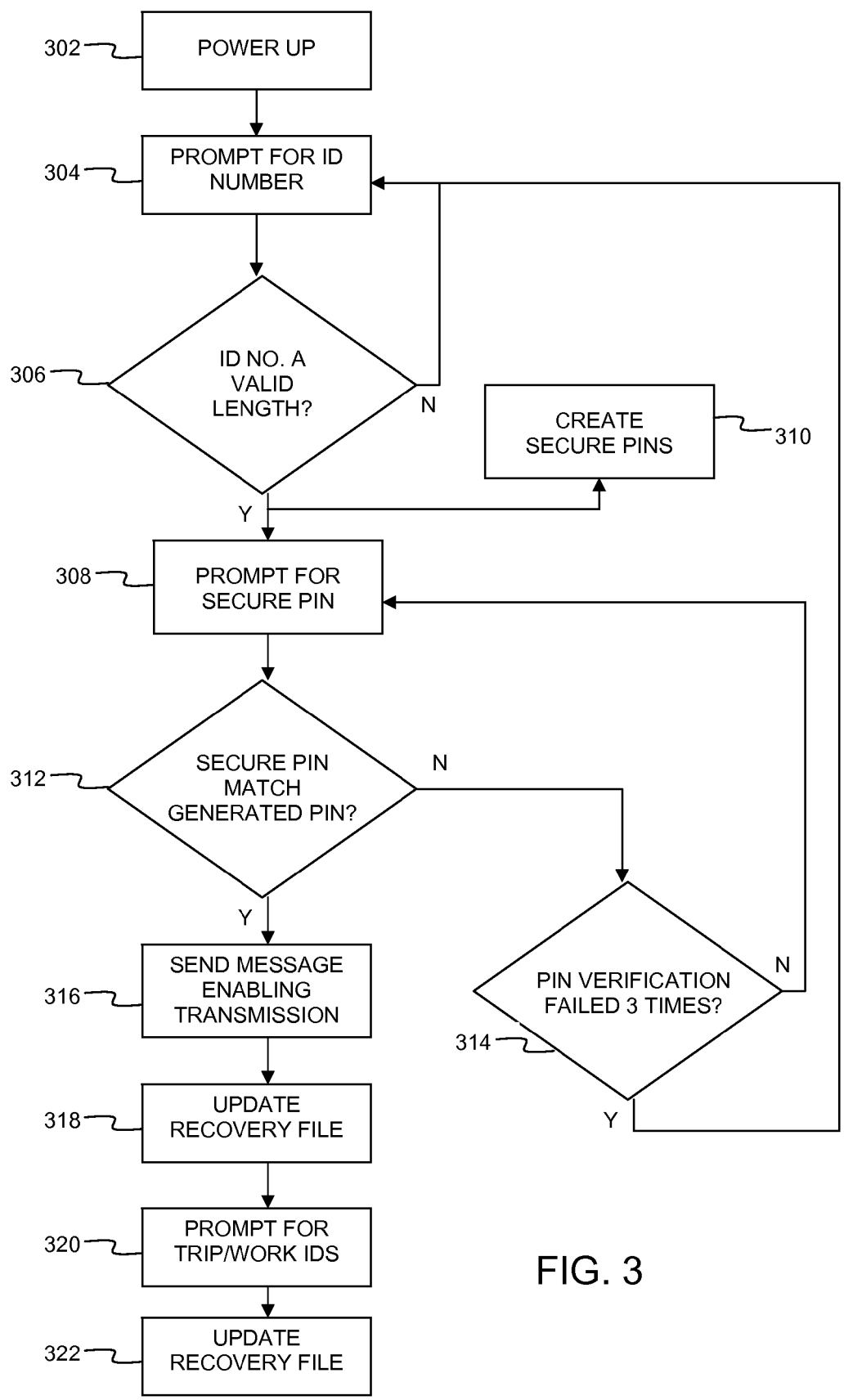
FIG. 3 is a flowchart illustrating a method for transmission control of a transit vehicle via operator authentication, according to an embodiment of the present invention.

FIG. 3 is a flow diagram illustrating a method for transmission control of a transit vehicle via operator authentication, according to an embodiment of the present invention. Specifically, the transit vehicle transmission control methodology is performed by the VLU 102, 202 of FIGS. 1 and 2, with an interface for operator input provided by the TCH.

In step 302, the transit vehicle and the VLU are powered up by the operator. Initialization of the VLU beings with the verification of a vehicle type held within configuration files of the VLU. Once it is determined that the vehicle type includes correct logic and hardware, a roll call request is sent from the VLU to ensure that the transmission of the transit vehicle can be communicated with.

In order to control transmission gear shift, monitoring of regular, consistent communication between the VLU and the multiplexor module is required. In the event of a loss of communication between the VLU and the multiplexor module, a roll call timeout is posted. Additional functionality may be added to enable the VLU to know that communication with the multiplexor module is down and that logic should be modified appropriately. The transmission may broadcast feedback at a fixed rate, i.e., every 100 milliseconds, regarding gear status.

In step 304, the TCH prompts the operator for identification information, i.e., an operator identification number or badge number. In step 306, the VLU determines whether the first input by the operator in response to the prompt has a length that is valid for identification information. Specifically, the VLU determines whether the number of digits that are input in response to the prompt are valid for an operator identification or badge number.

When it is determined that the length of the first input is invalid for identification information, the VLU returns to step 304 and re-prompts the operator for the identification information.

When it is determined that the length of the first input is valid for identification information, the TCH prompts the operator for a secure PIN, in step 308. In step 310, the VLU creates one or more secure PINs using the identification information of the operator and a date. Specifically, the VLU creates a first secure PIN using the identification number and the current date, and a second secure PIN using the identification number and the previous day's date. As described above, while the embodiments of the present invention are described with respect to a secure PIN system, smart card or biometric systems may be substituted for the secure PIN system in alternative embodiments of the present invention.

In step 312, it is determined whether a second input by the operator, provided in response to the prompt for the secure PIN, matches one of the secure PINs created in the VLU based on the operator's identification information. When it is determined that the second input does not match one of the stored secure PINs, PIN verification fails and it is determined whether a number of secure PIN verification failures has reached three, in step 314. When PIN verification has failed less than three times, the VLU returns to step 308 and the TCH re-prompts for the secure PIN of the operator. When PIN verification has failed three times, the VLU returns to step 304 and the TCH re-prompts for the identification information of the operator.

When it is determined that the second input matches one of the secure PINs generated in the VLU, the VLU sends a message, or signal, to enable gear selection of the transmission of the transit vehicle, in step 316. In step 318, recovery information, i.e., a recovery file, is updated to show that a valid operator log-on has occurred. Once operator authentication has occurred, the VLU will display on the TCH that the operator had a successful authentication.

In step 320, the TCH prompts the operator for a trip IDentifier (ID), which is a run number of the piece of work. In step 322, the recovery information is updated to include the trip ID.

Figure 4:
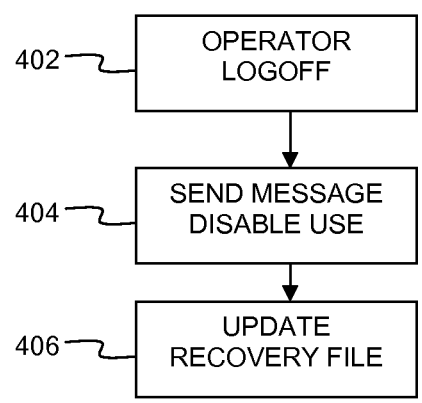
FIG. 4 is a flowchart illustrating a method for logging off an operator of a transit vehicle, according to an embodiment of the present invention.

Referring now to FIG. 4, a flow diagram illustrates a transit vehicle operator log-off methodology, according to an embodiment of the present invention. In step 402, the operator logs-off from the VLU. Specifically, at the end of an operator's shift, or during a mid route relief, the operator places the transmission of the transit vehicle into a neutral position via the transmission gear selector, and a log-off button is pressed. In step 404, a message or signal is transmitted to disable gear selection of the transmission of the transit vehicle. In step 406, the recovery information is updated to show that no valid log-on exists.

As an alternative to pressing a log-off button, automatic log-off may occur when a new operator logs on, when the operator leaves a driver's seat for a predetermined amount of time, or when the transit vehicle and the VLU are shut down. For example, when a new operator logs on and the new operator's information number is validated, in step 406 of FIG. 1, if a previous operator has not yet logged-off, the previous operator is logged-off automatically. Whenever a log-on state changes, this information is used to update the recovery file.

Figure 5:
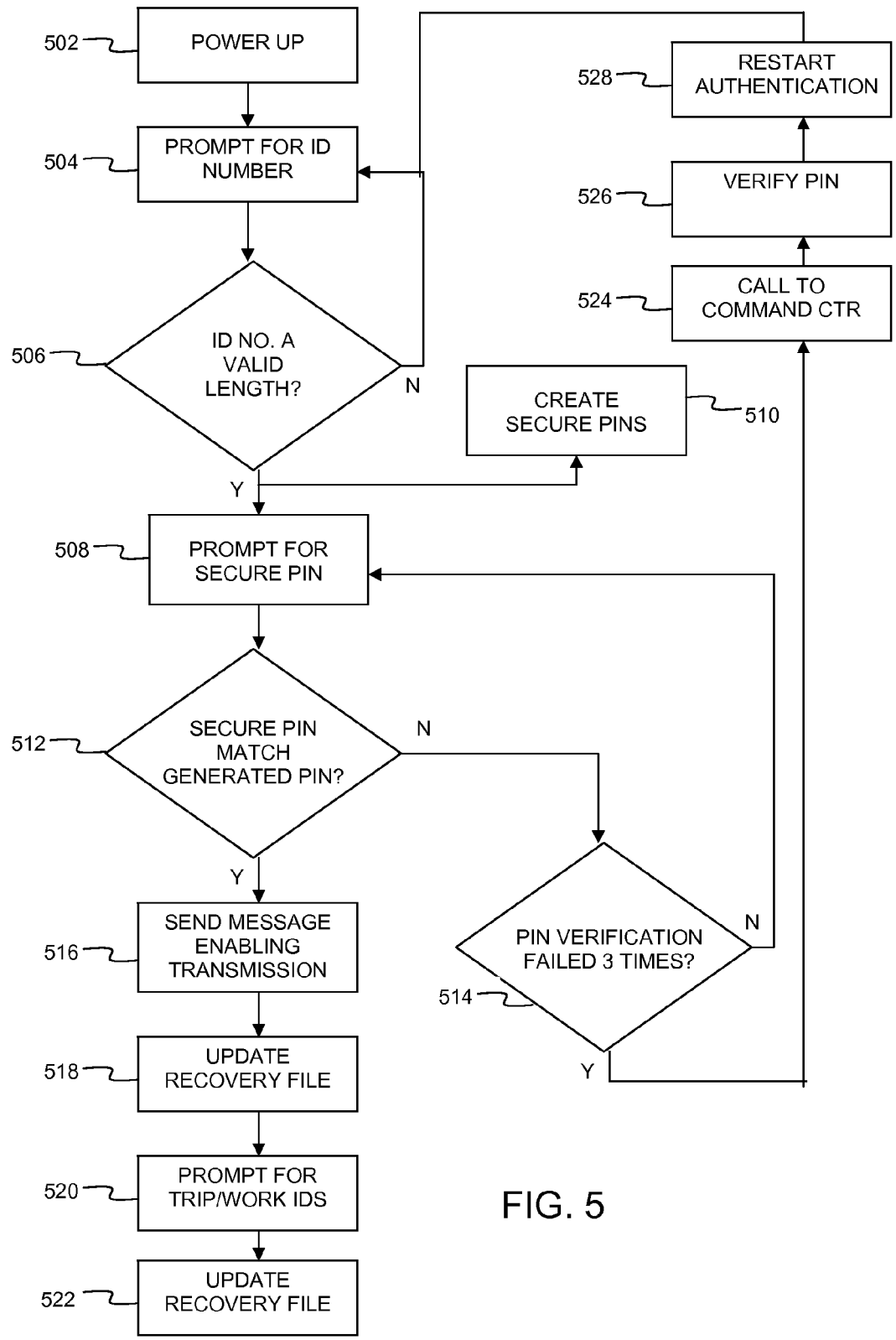
FIG. 5 is a flowchart illustrating a method for transmission control of a transit vehicle via operator authentication, according to another embodiment of the present invention.

Referring now to FIG. 5, a flow diagram illustrates a method for transmission control of a transit vehicle via operator authentication, according to another embodiment of the present invention. Steps 502 through 522 of FIG. 5 are substantially identical to steps 302 through 322 of FIG. 3, as described above. The methodology of FIG. 5 differs from that of FIG. 3 after it is determined that the secure PIN verification has failed three times, in step 514. When secure PIN verification has failed three times, the VLU places a call to a command center, in step 524. The call may be placed by the VLU through the CDMA or WLAN connections. In another embodiment of the present invention, the operator may place the call independent from the VLU. In step 526, the secure PIN of the operator is verified with the control center via the placed call. In step 528, authentication is restarted and the VLU returns to step 504 to prompt the operator for identification information.

Figure 6:
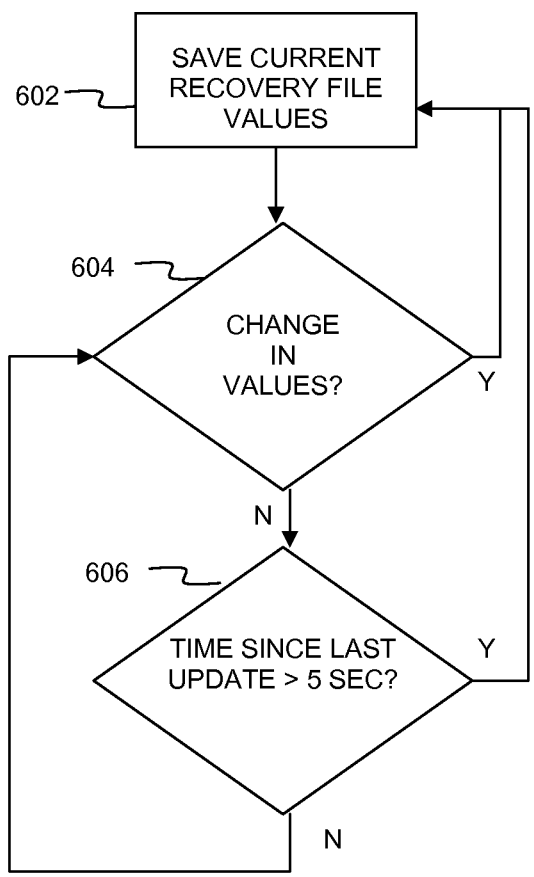
FIG. 6 is a flowchart illustrating a method for updating a recovery file, according to an embodiment of the present invention.

Referring now to FIG. 6, a flow diagram illustrates a recovery file updating methodology, according to an embodiment of the present invention. A recovery file is periodically recorded so that in the event of a crash of the VLU, the information of the recovery file can be used to recover a previous state of the VLU.

A current operator ID, a trip ID, a secure PIN authentication status, and a date/time stamp are saved as the recovery file, in step 602. In step 604, it is determined whether a change occurs in the operator ID or the trip ID. When a change occurs, the methodology returns to step 602 to save current values. When a change has not occurred, it is determined whether a time since a last update of the values is greater than a predetermined threshold, i.e., 5 seconds, in step 606. When the time since the last update of the values is greater than the predetermined threshold, the methodology returns to step 602 to save current values. When the time since the last update of the values is not greater that the predetermined threshold, the methodology returns to step 604 to determine whether a change has occurred.

Figure 7:
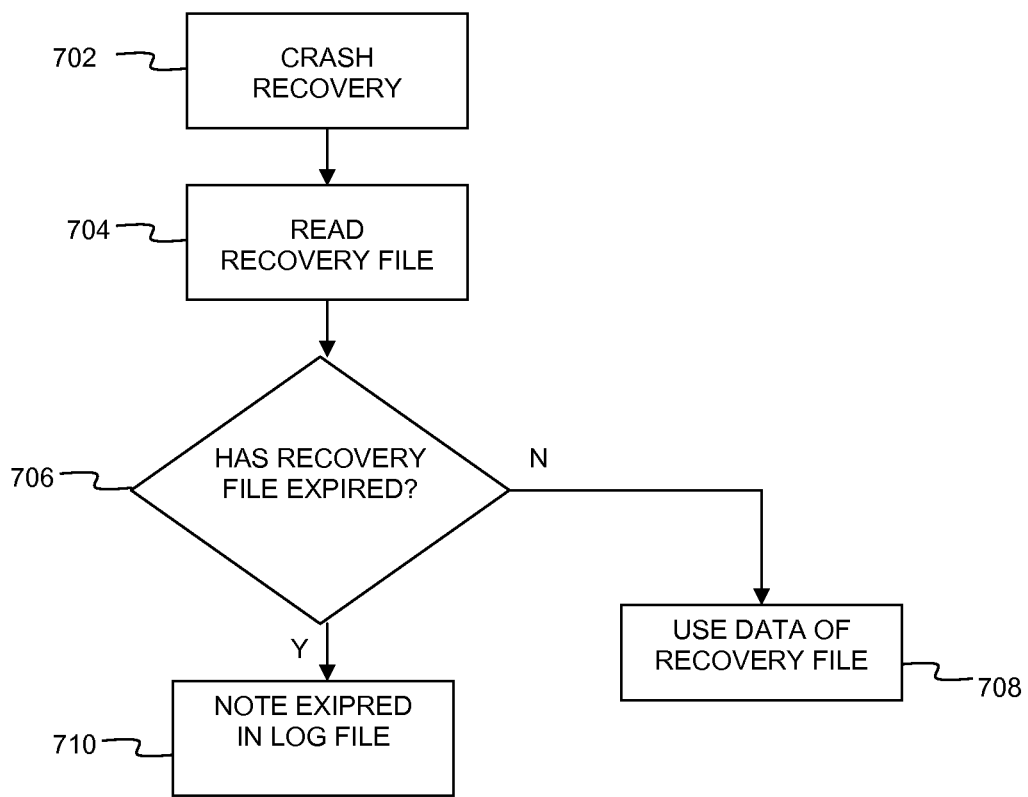
FIG. 7 is a flowchart illustrating a method for performing recovery after a system crash, according to an embodiment of the present invention.

Referring now to FIG. 7, a flow diagram illustrates a crash recovery methodology, according to an embodiment of the present invention. In step 702, crash recovery is initiated after a crash of the VLU. When VLU powers up, a recovery file is read from the memory, in step 704. In step 706, it is determined whether the recovery file has expired. Specifically, the date/time stamp of the recovery file is compared with a current date and time to determine whether the difference is greater than an expiration duration parameter. If the difference is greater than the expiration duration parameter, the recovery file is expired. When it is determined that the recovery file is not expired, the data from the recovery file is used to restore the log-on and system state of the VLU, and the recovery information is transmitted for proper control of the transmission of the transit vehicle, in step 708. When it is determined that the recovery file is expired, it is noted in a log file, in step 710.

Logging is configurable to have multiple levels of information. Troubleshooting has detailed logs, while normal operation limits the common and less critical messages. All changes in authentication status and failures are recorded in the log file. Communication issues, such as roll call timeouts and reflected status failures with the multiplexor module are recorded in the log file.

Use of the recovery mechanism is documented in the log file, even at the normal logging level. Any change in transmission selection is recorded along with the current selected gear. Mismatches between a lock state and a drive state are recorded. For example, if the operator logs off while driving into the garage, it should be recorded as a mismatch (i.e., logoff occurs while the bus is still moving and in gear). All changes in a Master Door Override (MDO) switch are recorded in the log file.

According to an embodiment of the present invention, the authorization procedure of the system may be overridden, and gear selection of the transit vehicle is enabled without proper operator authentication. This may occur when the VLU fails to boot or takes an extensive amount of time to boot up, at which point the VLU is considered to be non-functioning. Specifically, after a configurable time interval, the transmission of the transit vehicle is allowed to be engaged as if the VLU has signaled a proper operator authentication. The override state may also occur when a predefined switch is placed in a bypass mode. The predefined switch may be an interlock override switch or the MDO switch. The override options can be programmed into the system based on customer requirements.

A maintenance screen, or set of screens, is required to provide status and troubleshooting information for multiple components associated with the system. The screen displays all of the configurable parameters for the system, i.e., the number of failed secure PIN attempts prior to a forced re-logon, the number of seconds between updates to the recovery file, and the duration of the recovery expiry timer. Additionally, a sub-screen is provided to display data elements associated with the multiplexer module, i.e., roll call status (communicating/not communicating), designated current multiplexer module firmware and logic revisions, raw content (message ID and data field) of the secure bus access gear shift logic state broadcast from the VLU, raw content (message ID and data field) of the multiplexer module's broadcast of the gear shift logic state, raw content (message ID and data field) of selected and current gear, and current state of the MDS to be used for emergency override scenarios.

Figure 8:
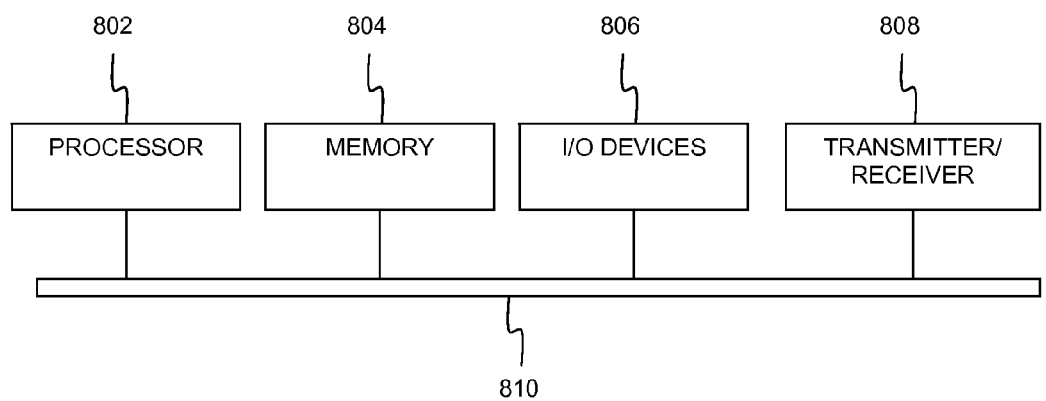
FIG. 8 is a block diagram illustrating an example of a hardware implementation of a computing system in accordance with which one or more methodologies of the present invention may be implemented.

Referring now to FIG. 8, a block diagram illustrates an illustrative hardware implementation of a computing system in accordance with which one or more methodologies of the invention, the methodologies described in the context of FIGS. 3-7) may be implemented. Specifically, according to an embodiment of the present invention, the block diagram of FIG. 8 may relate to certain components of the systems illustrated in FIGS. 1 and 2. As shown, the computing system may be implemented in accordance with a processor 802, a memory 804, I/O devices 806, and a transmitter/receiver 808, coupled via a computer bus 410 or alternate connection arrangement.

It is to be appreciated that the term "processor" as used herein is intended to include any processing device, such as, for example, one that includes a Central Processing Unit (CPU) and/or other processing circuitry. It is also to be understood that the term "processor" may refer to more than one processing device and that various elements associated with a processing device may be shared by other processing devices. The term "memory" as used herein is intended to include a memory associated with a processor or CPU, such as, for example, Random Access Memory (RAM), Read Only Memory (ROM), a fixed memory device (e.g., hard drive), a removable memory device, flash memory, etc. The processor 802 and memory 804 may be embodied in the VLU 102, 202 in FIGS. 1 and 2.

In addition, the phrase "I/O devices" as used herein is intended to include, for example, one or more input or output devices. The I/O devices 806 may be embodied as the VGA TCH 108, the microphone and speaker 110, 210, the interior signage 112, 212, the APC 116, 216, and the QSI TCH 118, 218 of FIGS. 1 and 2.

Still further, the phrase "transmitter/receiver" as used herein is intended to include, for example, one or more transmitters and receivers to permit the computer system to communicate with another computer system via an appropriate communications protocol. The transmitter/receiver may be embodied in the VLU 102, 202 of FIGS. 1 and 2. Accordingly, in an embodiment of the present invention, the VIE is provided communication access to the multiplexer module via a hardwire connection, and is able to transmit a signal through the system. The VLU is also able to transmit via a CDMA and WLAN connection.

Software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

While the invention has been shown and described with reference to certain embodiments thereof, it will be understood by those skilled in the art that various changes in form and detail may be made therein without departing from the spirit and scope of the invention as defined by the appended claims and their equivalents.

What is claimed is:

1. A method for controlling a transmission of a transit vehicle, the method comprising the steps of:
   receiving, by a Vehicle Logic Unit (VLU), a first input from an operator of the transit vehicle, upon start-up of the transit vehicle and the VLU;
   determining, by the VLU, whether a number of digits in the first input is valid for identification information of the operator;
   receiving, by the VLU, a second input from the operator, when the number of digits in the first input is valid;
   determining, by the VLU, whether the second input matches one of a plurality of Personal Identification Numbers (PINs);
   authenticating, by a Vehicle Logic Unit (VLU), the operator of the transit vehicle, when the second input matches one of the plurality of PINs; and
   transmitting, from the VLU, a signal enabling operator control of the transmission of the transit vehicle, when the operator of the vehicle is authenticated.

2. The method of claim 1, further comprising prompting the operator for the first input.

3. The method of claim 2, further comprising re-prompting the operator for the first input, when the number digits in the first input is invalid.

4. The method of claim 2, further comprising prompting the operator for the second input.

5. The method of claim 4, further comprising determining whether the second input has been received less than three times, when the second input does not match one of the plurality of PINs.

6. The method of claim 5, further comprising re-prompting the operator for the second input when the second input has been received less than three times.

7. The method of claim 5, further comprising re-prompting the operator for the first input, when the second input has been received three times.

8. The method of claim 7, further comprising communicating with a command center to verify a PIN of the operator before re-prompting the operator for the first input.

9. The method of claim 1, further comprising prompting the operator for a third input corresponding to a trip identifier after transmitting the signal enabling gear selection.

10. The method of claim 9, further comprising the steps of:
    storing the first input corresponding to the identification information of the operator, the second input corresponding to a PIN of the operator, the trip identifier, and a date/time stamp;
    determine whether there is change in at least one of the identification information, the PIN, and the trip identifier;
    determining whether a time since last storing is greater than a predetermined threshold, when there is no change in the at least one of the identification information, the PIN, and the trip identifier; and
    storing current values for the identification information, the PIN, the trip identifier, the date/time stamp, when the time since last storing is greater than the predefined threshold or when there is a change in the at least one of the identification information, the PIN, and the trip identifier.

11. The method of claim 10, further comprising recovering the stored values for the identification information, the PIN, the trip identifier, the date/time stamp, when recovering from a system crash.

12. The method of claim 11, further comprising:
    comparing the stored value of the date/time stamp with a current date and time to determine whether the date/time stamp is expired; and
    using the recovered stored values of the identification information, the PIN, and the trip identifier, when the date/time stamp is not expired.

13. The method of claim 1, further comprising:
    determining whether the operator has logged-off; and
    transmitting a second signal disabling the operator control of the transmission of the transit vehicle, when the operator has logged-off.

14. The method of claim 1, further comprising enabling an override state that enables the operator control of the transit vehicle when the VLU is considered non-functioning or when a predefined switch is placed in a bypass mode.

15. The method of claim 1, further comprising generating each of the plurality of PINs from the identification information of the operator and a respective date or time.

16. The method of claim 1, wherein VLU has at least one of a Wireless Local Area Network (WLAN) connection and a Code Division Multiple Access (CDMA) connection.

17. An apparatus for controlling a transmission of a transit vehicle, comprising:
   a memory;
   at least one processor coupled to the memory and operative to:
      receive a first input from an operator of the transit vehicle upon start-up of the transit vehicle;
      determine whether a number of digits in the first input is valid for identification information of the operator;
      receive a second input from the operator, when the number of digits in the first input is valid;
      determine whether the second input matches one of a plurality of Personal Identification Numbers (PINs);
      authenticate the operator of the transit vehicle, when the second input matches one of the plurality of PINs; and
   a transmitter coupled to the at least one processor and operative to transmit a signal enabling operator control of the transmission of the transit vehicle, when the operator of the vehicle is authenticated.

18. An article of manufacture for controlling a transmission of a transit vehicle, comprising a machine readable medium containing one or more programs, which when executed implement the steps of:
   receiving a first input from an operator of the transit vehicle, upon start-up of the transit vehicle;
   determining whether a number of digits in the first input is valid for identification information of the operator;
   receiving a second input from the operator, when the number of digits in the first input is valid;
   determining whether the second input matches one of a plurality of Personal Identification Numbers (PINs);
   authenticating the operator of the transit vehicle, when the second input matches one of the plurality of PINs; and
   transmitting a signal enabling operator control of the transmission of the transit vehicle, when the operator of the vehicle is authenticated.

\* \* \* \* \*